June 9, 1964  V. R. POWELL  3,136,053

METHOD OF FORMING CLOSE TOLERANCE TUBING

Filed March 7, 1960  3 Sheets-Sheet 1

VERNON R. POWELL
INVENTOR.

BY
William C. Babcock
ATTORNEY

June 9, 1964  V. R. POWELL  3,136,053

METHOD OF FORMING CLOSE TOLERANCE TUBING

Filed March 7, 1960  3 Sheets-Sheet 2

INVENTOR.
VERNON R. POWELL
BY
William C. Babcock
ATTORNEY

June 9, 1964   V. R. POWELL   3,136,053
METHOD OF FORMING CLOSE TOLERANCE TUBING
Filed March 7, 1960   3 Sheets-Sheet 3

INVENTOR.
VERNON R. POWELL
BY
William C. Babcock
ATTORNEY

United States Patent Office 3,136,053
Patented June 9, 1964

3,136,053
METHOD OF FORMING CLOSE TOLERANCE TUBING
Vernon R. Powell, Long Beach, Calif., assignor to Eastwood Acceptance Corp., Los Angeles, Calif.
Filed Mar. 7, 1960, Ser. No. 13,236
15 Claims. (Cl. 29—544)

The present invention relates generally to the field of metal forming, and more particularly to a method of forming close tolerance tubing and apparatus used in carrying out said method. This application is a continuation-in-part of copending application Serial No. 512,061 entitled Method for Forming Close Tolerance Tubing and Articles Thereon filed May 31, 1955, which issued as Patent No. 2,927,372 on March 8, 1960.

Since the filing date of said application Serial No. 512,061 certain improvements have been made in the method described and claimed therein whereby stock tubing is gripped and tensioned by forces exceeding the yield point of the material from which the tubing is fabricated, and when so gripped and tensioned, is subjected to the action of a rotating hard surface to permit the stock tubing to be transformed into close tolerance tubing having a desired wall thickness.

The invention disclosed in the present application is also directed to a method of transforming stock tubing to close tolerance tubing, but by means of which stock tubing is subjected to a first longitudinally directed force that does not stress the material forming the same above the yield point thereof. The material forming the stock tubing is thereafter subjected to a second radially directed force of sufficient magnitude to sink a hard surface therein a desired depth to compress the material, with the material forming the stock tubing being subsequently subjected to a third longitudinally directed force as the hard surface is concurrently rotated therearound and moved longitudinally relative thereto. The combined magnitude of the first and third forces is sufficiently great to cause permanent plastic deformation of the stock tubing to close tolerance tubing.

A major object of the present invention is to provide a method whereby stock tubing can be concurrently subjected to a tensioning force, a compressing force, and cross-rolling action to transform the stock tubing to close tolerance tubing of any desired wall thickness that is less than the wall thickness of the stock tubing, with the material in the transformed tubing, due to the stressing and cold working to which it has been subjected, possessing improved physical characteristics over the material of the stock tubing.

Another object of the invention is to provide a method whereby stock tubing can be transformed to close tolerance tubing having a wall thickness that is less than can be obtained by drawing the stock tubing on a draw bench.

A further object of the invention is to supply a method by means of which stock tubing can be transformed to close tolerance tubing by use of equipment and tooling that is far less expensive than draw bench equipment utilized heretofore in reducing the wall thickness of a tubular member.

Yet another object of the invention is to furnish a method whereby the strength of the material in the transformed close tolerance tubing may be greatly increased over that of the material in the stock tubing, with the material in the transformed close tolerance tubing capable of being controlled to have physical characteristics that vary between those of a rolled sheet of the same material to a wire of the same material, or a combination of physical characteristics common to both a rolled sheet and wire.

A still further object of the invention is to provide a process that permits greater elongation of stock tubing than has hitherto been possible, with the exception of the method as defined and claimed in copending application Serial No. 512,061, Patent No. 2,927,372.

Another object of the invention is to furnish a method that is particularly adapted for use in reducing the wall thickness of pipe or tubing formed of material such as zirconium that has a tendency to gall when it is attempted to cold draw the same on a draw bench.

Yet another object of the invention is to provide a method, which due to its flexibility, permits the commercial use thereof equally effectively in the production of small or large quantities of close tolerance tubing.

Another object of the invention is to supply a gripping apparatus of simplified design by means of which the end portions of a tubular member can be removably engaged to place a tensional load thereon.

A still further object of the invention is to provide a method and apparatus for use therewith by means of which the wall thickness of a tubular member can be reduced to a desired degree without the application of heat, and without leaving high tangential internal forces in the transformed tubular member of such magnitude as to cause cracking of the tubular member when it is subsequently subjected to heat or corroding conditions such as occasionally occur in tubular members when cold drawn upon a draw bench.

These and other objects and advantages of the invention will become apparent from the following description thereof, and from the accompanying drawings illustrating the same in which.

Figure 10:
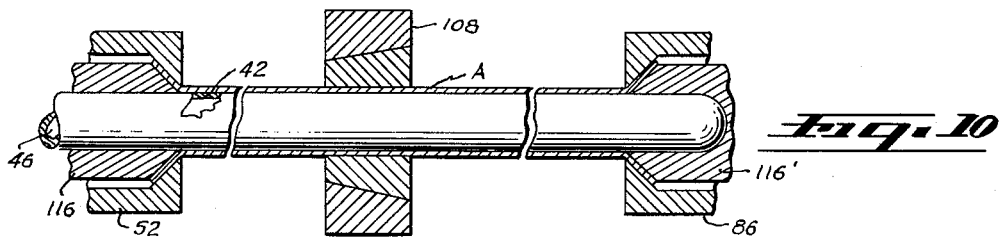
Figure 11:
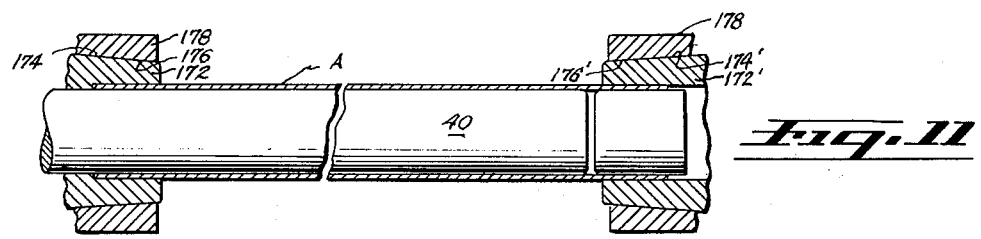
Figure 5A:
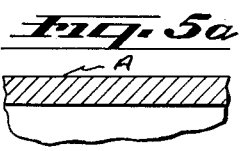
FIGURE 5a is a fragmentary cross-sectional view of a tube prior to being subjected to said process.
Figure 5B:
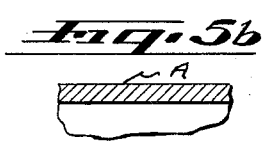
FIGURE 5b is a fragmentary cross-sectional view of a tube after being subjected to said transformation process.

FIGURE 10 shows commercial stock tubing being transformed to tubing having side walls of lesser but uniform thickness by a fifth process that includes the use of a hollow resilient mandrel into which a fluid is introduced under high pressure and the tubing is concurrently subjected to compression and cross-rolling; and FIGURE 11 illustrates commercial stock tubing as it is being transformed to tubing having side walls of lesser but uniform thickness by a sixth process that includes the additional step of applying torsional twist to the tubing during the transformation thereof.

Figure 1:
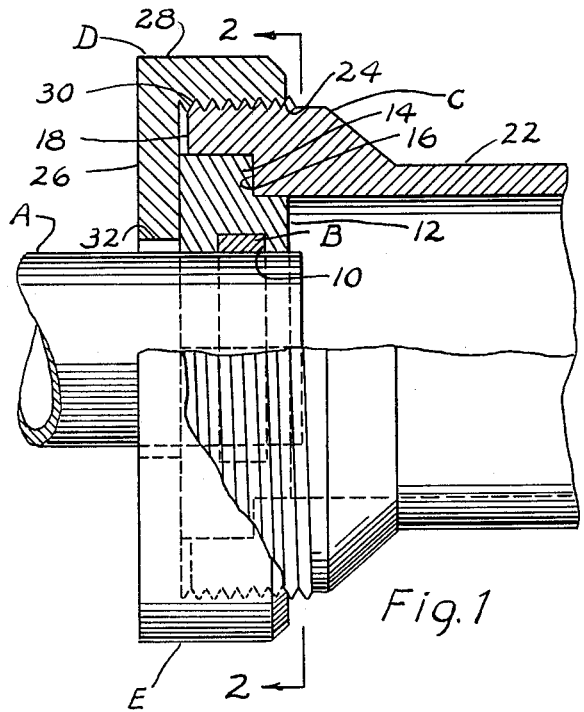
FIGURE 1 is a combined side elevational and longitudinal cross-sectional view of the tube gripping mechanism.

With continued reference to the drawings, an end portion of a length of stock tubing A is shown in FIGURE 1 thereof that is formed of a metallic material which permanently deforms when subjected to a stress exceeding the elastic limit thereof. As is well known, the wall thickness of such stock tubing may vary substantially throughout its length. For some purposes, variations in wall thickness of the tubing A is unimportant, but in other applications of the tubing, uniform wall thickness is of the utmost importance. There is also a demand in experimental and research activities for tubing of a particular metal of a particular uniform wall thickness that may not be commercially available. In addition, there is a demand for tubing of the character described that is truly circular in cross section, which again in many instances is not available.

The apparatus and method hereinafter described permit either small or large scale production of close tolerance tubing of true, circular transverse cross section in any metal desired, provided that stock tubing A of that metal is available in the same size or larger, than that from which it is desired to form the close tolerance tubing.

Figure 3:
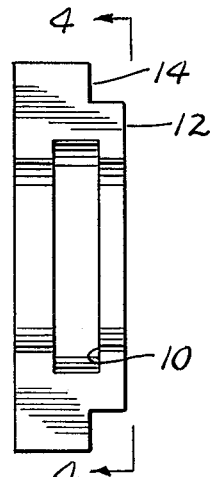
FIGURE 3 is a top plan view of one of the dies.
Figure 2:
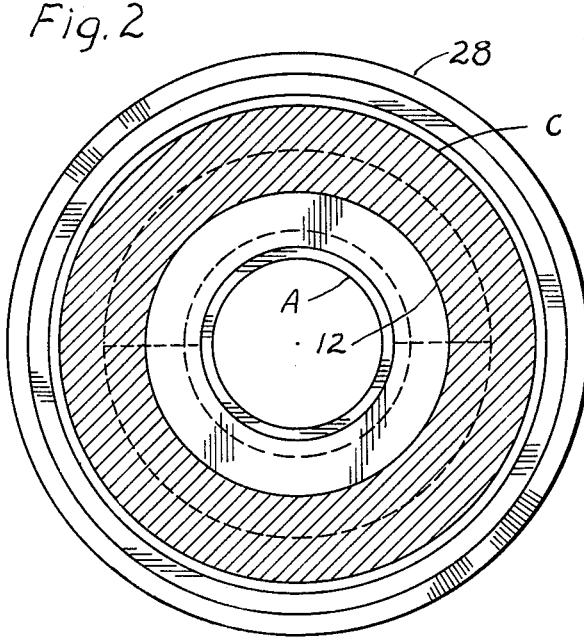
FIGURE 2 is a transverse cross-sectional view of the device taken on line 2—2 of FIGURE 1.
Figure 4:
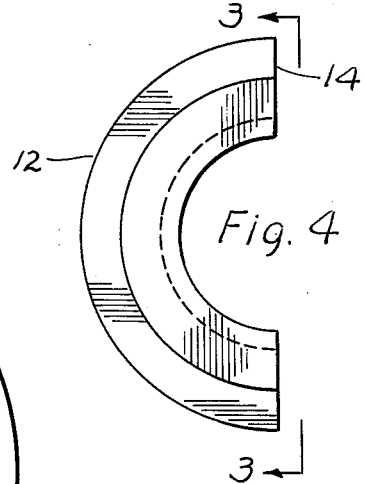
FIGURE 4 is a front elevational view of one of the dies.

The stock tubing A may be longitudinally tensioned as shown and described in said application Serial No. 512,061 by being suitably gripped on the flared ends thereof, or in lieu thereof, the tubing may have identical gripping rings B welded or otherwise affixed to the exterior surface thereof as shown in FIGURE 1 of the present application to permit application of tension thereon. Rings B are preferably of rectangular transverse cross section and fit snugly within the confines of two semi-circular grooves 10 formed on the interior surfaces of two half-circular dies 12. One of these dies is shown in FIGURES 3 and 4.

The dies 12 are structurally identical, and are adapted to be disposed in abutting contact as shown in FIGURE 1 to encircle an end portion of tubing A. Semi-circular flanges 14 project from dies 12 and are adapted to be seated in a circumferentially extending recess 16 formed in a face 18 of a die holder C.

Although but one is shown, two die holders C are provided which are oppositely disposed and situated adjacent the ends of tubing A. Die holders C are supported in longitudinal alignment by heavy tubular members 22 as illustrated in FIGURE 1. One of the die holders C preferably remains stationary, while the other die holder is moved longitudinally away therefrom. The die holders C are circular and have threads 24 formed on the exterior surfaces thereof. Two cup-shaped members D are provided, each of which is defined by a circular plate 26 from which a cylindrical side wall 28 extends that has threads 30 formed on the interior surface thereof. Each plate 26 has a centrally disposed opening 32 formed therein of sufficient size to permit rings B to pass therethrough.

When the rings B are disposed in dies 12 and the dies 12 in turn are positioned in the die holders C, the threads 24 are rotated on threads 30 until the plates 26 are in abutting contact with the dies. Tubing A is then removably locked in the dies 12 and can be tensioned to the desired degree by movement of one of the die holders C away from the other while remaining in longitudinal alignment therewith.

Figure 5:
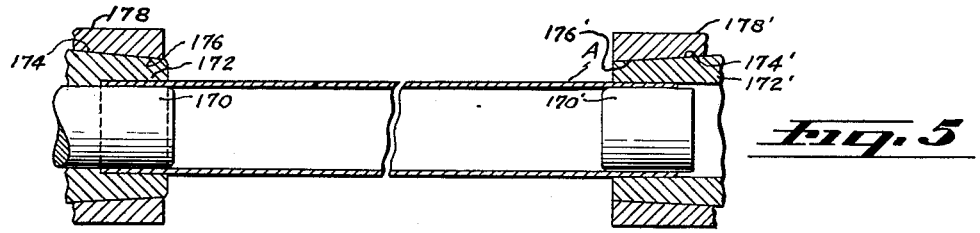
FIGURE 5 shows a commercial stock tube being transformed by a first process to one having side walls of lesser but uniform thickness.

Tension on tubing A can also be achieved by using the method described in said application Serial No. 512,061, particularly as shown in FIGURE 4 thereof, which figure is reproduced as FIGURE 5 in the present application.

Figure 6:
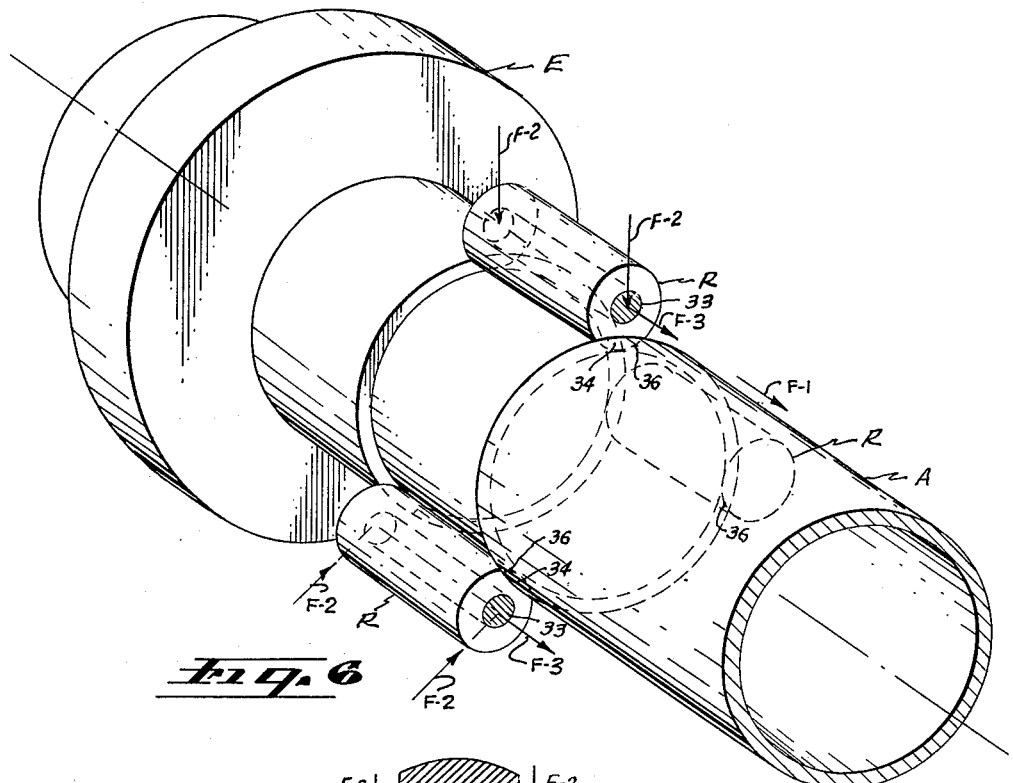
FIGURE 6 is a perspective view of an end portion of a tube or pipe shown removably gripped by the invention illustrated in FIGURES 1-4, with the tube being subjected to tensional loading as well as compression, cross-rolling and further tensional loading by a plurality of hard rollers that not only roll around the tubing but move longitudinally relative thereto.

Two stub mandrels 170 and 170′ are placed in the end portions of tubing A, and split jaws 172 and 172′ are caused to engage the exterior surfaces of the tubing above the stub mandrels. Jaws 172 and 172′ are preferably formed with tapered exterior surfaces 174 and 174′ that engage opposing tapered surfaces 176 and 176′ formed on two housings 178 and 178′. When the spacing between housings 178 and 178′ increases, the tension on tubing A increases, whereby the tubing can thus be deformed to the desired degree. As shown in FIGURES 1 or 5, the wall thickness of tubing A may be reduced substantially 20% without the use of a mandrel by subjecting it to a first method as illustrated in FIGURE 6. This percentage will vary somewhat due to the physical structure of the particular metal or alloy of metals from which the tubing A is fabricated.

Prior to a detailed discussion of this method, certain fundamental physical facts relative to metallic materials or metal alloys must be considered. First, all metals are crystalline. Therefore, all physical characteristics of these metals or alloys thereof are determined either by the nature of the minute crystals of which they are composed, or by the particular patterns in which these crystals are disposed to define larger masses. In general, it will be found that a metal or alloy of metals composed of small crystalline grains will be stronger and harder than an otherwise identical piece of the same metal or alloy composed of larger grains.

When a metallic material is stressed, it tends to deform. The strain under which the metal is placed can be either elastic or plastic. The elastic strain will disappear completely in time when the stress causing the same is removed. However, the plastic strain produces a permanent deformation of the metallic material, with the metal being concurrently hardened and strengthened. This effect is known as work hardening.

A satisfactory explanation as to why work hardening takes place is not known. However, from experience it has been found that as a metallic material is stressed above the elastic limit thereof, the first section of the metal to plastically deform will be the weakest one. This initially weakest section will, by deformation, be work or strain-hardened, and strengthened until it can sustain the load. The next weakest section will then have to bear the load, and it will deform and be strain-hardened until it, too, can bear the load. This progressive strengthening of the metal continues with elongation thereof until equilibrium is established therein to sustain the particular load imposed thereon.

From the above description of what occurs as a metallic material is deformed when a plastic strain is imposed thereon, it will be apparent that the material can be work hardened to a desired shape without high residual stresses being left therein if the deformation process is permitted to take place gradually. The deformation of the metal defining a stock tubing to close tolerance tubing does take place gradually in the method hereinafter described, which is in sharp contrast to the almost instant formation of a section of tubing to a reduced wall thickness and reduced diameter when cold worked on a draw bench.

One disadvantage of cold drawing of tubing on a draw bench is that high internal stresses remain in the drawn tubing, and these stresses are frequently so great that they actually result in cracking of the tubing when it is later subjected to heat or to corroding conditions. A further disadvantage of drawing tubing on a draw bench is that the wall thickness can only be reduced to a certain minimum, for when the wall has been reduced to this minimum thickness the wall does not posses sufficient strength to pull the non-reduced tubing between the forming die and mandrel.

In the cold drawing of seamless tubing on a draw bench, it has been determined that when the wall thickness only is reduced, the structure of the drawn metal is identical to that of a rolled sheet. Also, it has been determined that when the wall thickness and circumference of the tubing are reduced equally, the texture of the drawn tube is that of a wire. A metal cold worked in a single direction should be strain hardened as to subsequently applied tensional loading in the direction in which the working took place. Such a cold worked material would have toughness and high tensile working in the direction of elongation, but could be brittle and relatively weak as to loading in a direction normal to the direction it is drawn. This disadvantage of tubing which is drawn in a single direction is eliminated in the methods hereinafter described.

With the present method stock tubing is gradually deformed in both a longitudinal and a transverse direction, and the tension strength and toughness of the metal in both directions is controllable as a result thereof.

In FIGURE 6 a length of tubing A is shown positioned between two longitudinally separated gripping mechanisms E of the type shown in FIGURES 1 to 4, with one of the gripping mechanisms being held stationary, and the other (not shown) being moved axially away therefrom. Movement of the gripping mechanism away from the one shown in FIGURE 6 is under such conditions that a longitudinally applied stress or force F–1 is exerted on tubing A. The magnitude of stress F–1 is maintained constant during the tubing transforming operation by hydraulic or other means.

Three identical cylindrical rollers R are provided that are formed from a hard material such as one of the cemented carbides, such as tungsten carbide, tantalum carbide or titanium carbide. Rollers R are rotatably supported by shafts 33 that extend longitudinally therethrough as shown in FIGURE 6. Rollers R are held by a fixture (not shown) on spacings of 120° relative to one another, and are adapted to be moved radially toward the tubing A when it is desired to exert compressional loading thereon. After longitudinal tensioning of tubing A, the rollers R are moved toward the tubing to exert a radial second force F–2 thereon. The magnitude of the force F–2 on each of the rollers is sufficient to sink each roller into the metal defining the tubing the desired depth to reduce the thickness of the wall thereof with one longitudinal pass of the rollers R thereover.

After tubing A has been tensioned by force F–1 and compressed by rotation of rollers R to exert a force F–2 thereon, the rollers R are concurrently with their rotation moved to the right (FIGURE 6) to exert a third longitudinally directed force F–3 on tubing A. Rollers R exert force against depressed surface areas 34 that are in pressure contact with the lowermost end surface areas 36 of the rollers. Depending upon the physical characteristics of the metal defining tubing A, the force F–1 is just below that magnitude at which plastic deformation of the tubing A starts. Thus, the force F–3 can be substantially less than force F–1 and range between 10% to a small fraction of 1% of the magnitude thereof. The advantage of this relationship between the forces F–1 and F–3 resides not only in the fact that it permits very close control of the total longitudinal strain to which tubing A is subjected, but that it permits use of lightweight, relatively inexpensive rollers R. Furthermore, the above described operation may, in many instances, be carried out without the use of a mandrel (not shown) inside tubing A.

After rollers R have traversed the length of tubing A to reduce the wall thickness thereof a desired amount and concurrently elongate the tubing, the rollers are sunk to a new depth in the material defining the tubing and caused to traverse the length thereof in the opposite direction. This process is continued until the wall thickness of the tubing A has been reduced the desired amount to provide close tolerance tubing.

Figure 7:
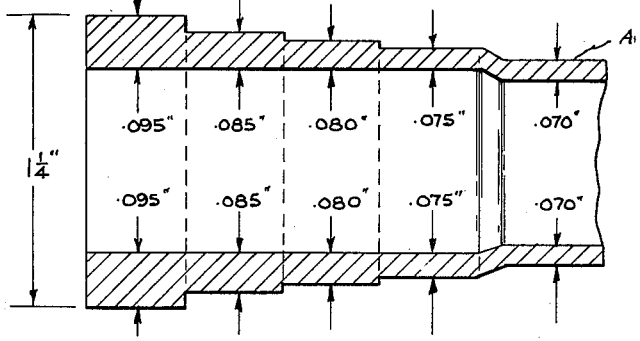
FIGURE 7 is a longitudinal cross-sectional view of a tube illustrating the manner in which wall reduction is effected thereon by a second method when the tube is subjected to the action of the apparatus illustrated in FIGURE 5.

FIGURE 7 diagrammatically illustrates the results attained in reducing a length of stock tubing A formed of 304 stainless steel. Tubing A initially had an external diameter of 1¼″ and a wall thickness of .095″, and was subjected to the forming operation just described without the use of a mandrel. On the first pass of rollers R thereover, the wall thickness was reduced to .085″. A second pass of rollers R over the tubing in the reverse direction reduced the wall thickness to .080″. A third pass over tubing A by rollers R in the same direction as the first pass reduced the wall thickness to .075″. At this point, the internal diameter of tubing A was 1.06″, the same internal diameter as when the operation started. When it was attempted to further reduce the wall thickness to .070″ without the use of a mandrel the internal diameter of tubing A started to decrease.

Figure 8:
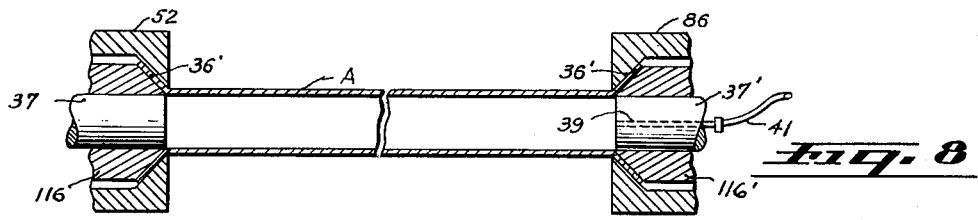
FIGURE 8 illustrates stock tubing as it is being transformed to one having side walls of lesser but uniform thickness by a third process, with the transformed tubing being of circular transverse cross-section.

FIGURE 8 illustrates the manner in which stock tubing A could be transformed to close tolerance tubing of reduced wall thickness by means of an alternate method which is identical to the method just described except that flared ends 36′ are formed thereon. Should an elongate rigid mandrel 40 of such transverse cross section as to just slidably fit within tubing A be inserted therein, as shown in FIGURE 11, the above described first method can be carried out to transform tubing A to close tolerance tubing of any desired wall thickness. Of course, the transformed wall thickness must be less than that of the stock tubing A. The results that may be achieved by the first process when a mandrel 40 is used are shown by the following two examples.

*Example No. 1*

Material: 321 stainless steel seamless tubing having 1,800″ outside diameter and wall thickness of .087″.

| Pass no.: | Wall thickness at end of pass (inches) |
|---|---|
| 1 | .065 |
| 2 | .055 |
| 3 | .045 |
| 4 | .035 |
| 5 | .025 |
| 6 | .020 |
| 7 | .016 |
| 8 | .012 |
| 9 | .010 |
| 10 | .008 |
| 11 | .005 |
| 12 | .004 |
| 13 | .003 |

*Example No. 2*

Material: Zircaloy (zirconium) seamless tubing finished by Allegheny-Ludlum Steel Corporation having a 1.800″ outside diameter and a wall thickness of .085″.

| Pass no.: | Wall thickness at end of pass (inches) |
|---|---|
| 1 | .070 |
| 2 | .060 |
| 3 | .050 |
| 4 | .040 |
| 5 | .030 |
| 6 | .025 |
| 7 | .017 |

In both of these examples the wall thickness of the tubing A has been reduced far below that which can be obtained on a draw bench. Furthermore, thin-walled zirconium tubing cannot be formed on a draw bench due to the tendency of this material to gall.

In FIGURE 8 a third alternate method is shown that is similar to the second, except that two plugs 37 and 37′ close the bores in pistons 116 and 116′. A passage 39 extends through plug 37′ and is connectible to a conduit 41 leading to a source of hydraulic fluid under pressure. During the forming operation, hydraulic fluid under pressure is maintained in tubing A to prevent inward movement of the wall structure thereof, such as occurs when the wall structure is thinned to .070″. The hydraulic fluid in tubing A is maintained at constant pressure for the tubing A elongates and takes the place of a solid mandrel, such as the mandrel 40 shown in FIGURE 11.

Figure 9:
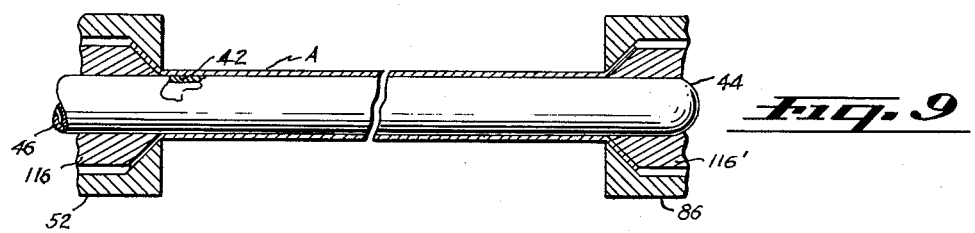
FIGURE 9 shows commercial stock tubing having side walls of lesser but uniform thickness by a fourth process that includes the use of a hollow resilient mandrel into which a fluid is introduced under high pressure.

FIGURE 9 illustrates a fourth alternate method in which a hollow resilient mandrel 42 is inserted within the tubing A prior to transformation thereof to close tolerance tubing. The transverse cross section of mandrel 42 is slightly less than that of the bore extending through tubing A. One end 44 of mandrel 42 is preferably closed. A fluid under high pressure is introduced into the open end 46 of mandrel 42 after the forming operation on tubing A is completed. Mandrel 42 expands radially, and stretches the transformed tubing transversely into a true circular configuration.

In FIGURE 10 a fifth alternate method is shown in which the resilient mandrel 42 can be radially expanded by the introduction of fluid under pressure into the confines thereof through end 46. Such expansion of the mandrel 42 can be radially expanded by the introduction of fluid under pressure into the confines thereof through end 46. Such expansion of the mandrel radially expands tubing A and permits application of force F-2 to the exterior surface of the tubing by sizing die 108 or the rollers R shown in FIGURE 6. Major adjustment of the force F-2 may be made by shortening or lengthening the radius of rotation of the rollers R, and minor adjustments may be made by varying the pressure of the fluid in mandrel 42.

A sixth alternate method is shown in FIGURE 11, which is similar to the first method, other than that the jaws 172′ are rotated relative to the jaws 172 during the reduction of the wall thickness of tubing A by application of forces F-1, F-2 and F-3 described in detail hereinabove. By selecting the rate of relative rotation of jaws 172′, as well as the direction of rotation, the material stressed in the direction of the applied force F-1 can be caused to rotate to assume a helical configuration in the transformed close tolerance tubing. Continued rotation of jaws 172′ relative to jaws 172 with resulting increased torsion on tubing A results in so stressing the tubing that the maximum tensile elongation is transverse to the longitudinal axis of the tubing and maximum compressive strain is longitudinal. That such torsional stressing of tubing A actually occurs has been demonstrated on seamed tubing, where the seam as the torsional tensioning of the tubing occurs in combination with the other forces F-1, F-2 and F-3 tends to assume a more and more spiral configuration.

Figure 6A:
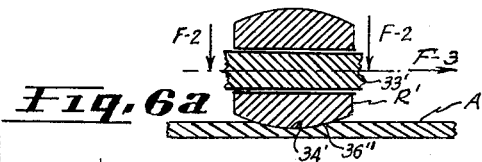
FIGURE 6a is a longitudinal cross-sectional view of one of the pressure rollers and tubing with which it is in contact.

In FIGURE 6 the rollers R are illustrated as cylinders. However, if desired rollers R′ of the configuration shown in FIGURE 6a can be employed in carrying out the present process. The rollers R′ are rotatably supported on shafts 33′ to which the forces F-2 and F-3 are applied as previously described in detail. As can be seen in the longitudinal cross-sectional view of FIGURE 6a, each roller has a curved surface 35 that is longitudinally convex, and deforms and compresses the metal in tubing A to the configuration identified by the numeral 34′. The force F-3 on each roller R′ is exerted on the metal of tubing A at the position 36″ shown in FIGURE 6a.

Although the form of the invention herein shown and described is fully capable of achieving the objects and providing the advantages hereinbefore mentioned, it is to be understood that it is merely illustrative of the presently preferred embodiments thereof and that I do not mean to limit myself to the details of construction herein shown and described other than as defined in the appended claims.

I claim:

1. A cold stretching method of transforming stock resilient metallic tubing to close tolerance tubing having improved physical qualities and of a wall thickness less than that of said stock tubing, comprising the steps of: disposing a length of said stock tubing in a longitudinally extending position; placing said length of tubing under tension by applying a first force longitudinally to the end portions thereof; increasing the tension on said length of tubing by increasing said first force to a value less than the yield strength of the material forming said stock tubing; exerting a second force on at least one hard surface to sink the same radially into said stock tubing tensioned by said first force to the depth that it is desired to reduce said wall thickness; circumferentially rotating said hard surface at said desired depth about said stock tubing; moving said hard surface longitudinally relative to said stock tubing with concurrent application of a third longitudinally directed force to said hard surface which third force in combination with said first force subjects a transverse area of said stock tubing which is in pressure contact with said hard surface to a stress above that at which said material permanently deforms; and continuing to move said rotating hard surface longitudinally relative to said stock tubing at said combined first and third forces until the length of said tubing has had the wall thickness thereof reduced substantially the amount which said hard surface was sunk therein.

2. A method as defined in claim 1 wherein said hard surface is of such configuration as to rotate and is so disposed to place the axis of rotation thereof parallel to the longitudinal axis of said tubing.

3. A method as defined in claim 1 wherein said hard surface is a surface of rotation, with said hard surface rolling on the exterior surface of said tubing as said hard surface rotates therearound.

4. A method as defined in claim 1 which includes the additional step of resetting said hard surface to a new depth in said material after said hard surface has traversed said tubing, and thereafter repeating said method until the wall thickness of said portion of said tubing has been reduced to a desired thickness.

5. A method as defined in claim 1 which includes the further step of resetting said hard surface to a new depth after said hard surface has traversed said tubing and thereafter repeating said process but with said hard surface traversing said portion in a direction opposite to that which it first traversed said portion.

6. A method as defined in claim 1 wherein an elongate first rigid cylindrical surface is disposed in said stock tubing prior to said first and third forces being concurrently applied thereto.

7. A method as defined in claim 1 wherein an elongate first rigid cylindrical surface is disposed in said stock tubing prior to concurrent application of said first and third forces thereto, said first surface having a transverse cross-sectional area that is slightly smaller than that of the transverse area of the bore of said tubing after said transformation has been completed.

8. A method as defined in claim 1 which includes the further step of defining a confined space in said stock tubing, and maintaining said confined space at a substantially constant pressure while said first and third forces are concurrently applied to said stock tubing.

9. A method as defined in claim 1 which includes the further step of rotating one end portion of said stock tubing while holding the opposite end in a fixed position at least during the time said first and second forces are concurrently applied to said stock tubing.

10. A method as defined in claim 1 which includes the further step of applying torsion to said stock tubing during at least the time said first and second forces are concurrently applied to said stock tubing.

11. A method as defined in claim 6 wherein said first cylindrical surface is defined by a hollow resilient body that defines a confined space, and said method includes the further step of introducing fluid into said confined space under a sufficiently high pressure to radially expand said body to the extent that said first cylindrical surface is in contact with the interior surface of said stock tubing prior to concurrent application of said first and third forces thereto.

12. A cold stretching method for transforming stock resilient metallic tubing to close tolerance tubing comprising the steps of: forming projecting surfaces on the end portions of a length of said stock tubing; disposing a length of said stock tubing in a single plane; placing said length of tubing under tension in a cold state by application of a first force longitudinally to said projecting portions; increasing the tension on said length of tubing by increasing said first force to a value less than the yield strength of the material forming said stock tubing; moving at least one hard surface radially relative to said tubing with application of a second force until said hard surface has been sunk into the material defining said tubing to form a recess of a desired depth therein; rotating said hard surface about said tubing to sequentially deform the surface of said tubing to said depth; maintaining said first force on said tubing and maintaining said second force on said hard surface as said hard surface rotates about said tubing; moving said hard surface longitudinally relative to said tubing by application of a third force as said hard surface rotates to apply said third force to an edge portion of said recess substantially normally disposed relative to said tubing, with the magnitude of said first and third forces when combined subjecting said tubing to tensional loading sufficiently great to permanently deform the same; and continuing said longitudinal movement of said hard surface during rotation thereof until the portion of said tubing that is desired to be transformed to close tolerance tubing has been traversed by said hard surface.

13. A method as defined in claim 12 in which the step of forming said projecting surfaces results in said end portions assuming a flared configuration.

14. A method as defined in claim 12 in which said forming of said projecting surfaces includes the affixing of two bodies to said end portions to define the same.

15. A method as defined in claim 14 wherein said two projecting surfaces are ring-shaped.

References Cited in the file of this patent

UNITED STATES PATENTS

| 1,129,835 | Lloyd et al. | Feb. 23, 1915 |
| 1,709,011 | Fulton | Apr. 16, 1929 |
| 1,992,580 | Pillatsch | Feb. 26, 1935 |
| 2,023,727 | Esser | Dec. 10, 1935 |
| 2,026,605 | Antisell | Jan. 7, 1936 |
| 2,108,790 | Inscho | Feb. 22, 1938 |
| 2,178,141 | Frame | Oct. 31, 1939 |
| 2,366,141 | Alderfer | Dec. 26, 1944 |
| 2,383,692 | Smith | Aug. 28, 1945 |
| 2,812,572 | Altwicker et al. | Nov. 12, 1957 |
| 2,835,961 | Neel et al. | May 27, 1958 |
| 2,927,372 | Powell | Mar. 8, 1960 |

FOREIGN PATENTS

| 175,925 | Australia | Aug. 25, 1953 |